Jan. 26, 1965 K. E. HUMBERT, JR., ETAL 3,167,416
DISPOSABLE FILTER BREATHER CAP
Filed March 17, 1961 3 Sheets-Sheet 1

INVENTORS
KINGSLEY E. HUMBERT, JR.
THEODORE KAFITZ
BY
ATTORNEYS

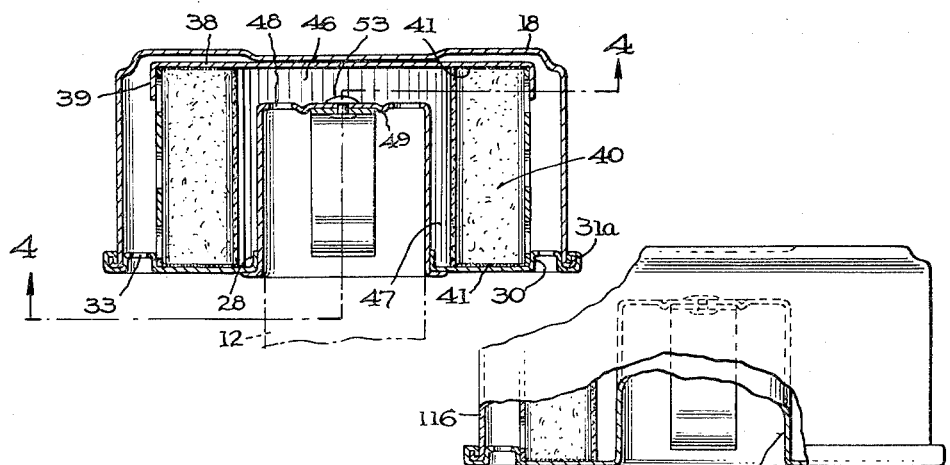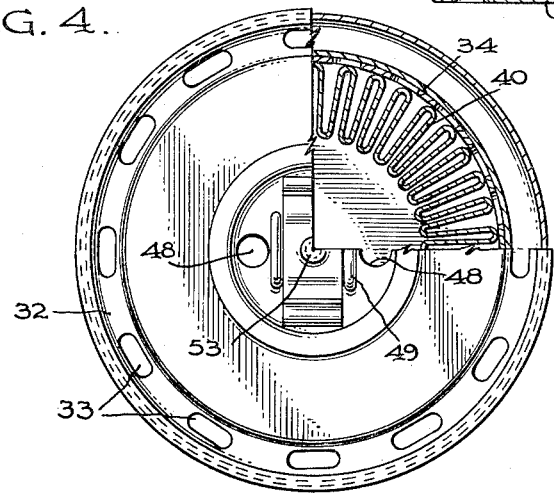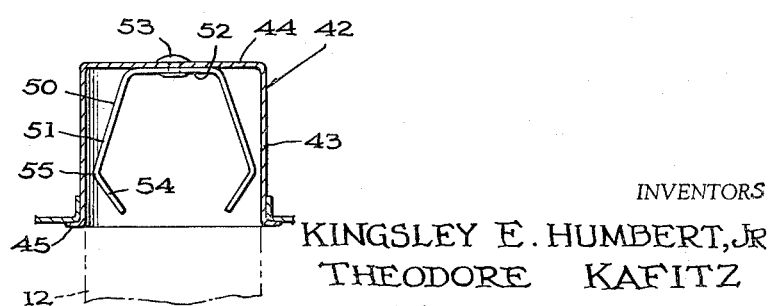

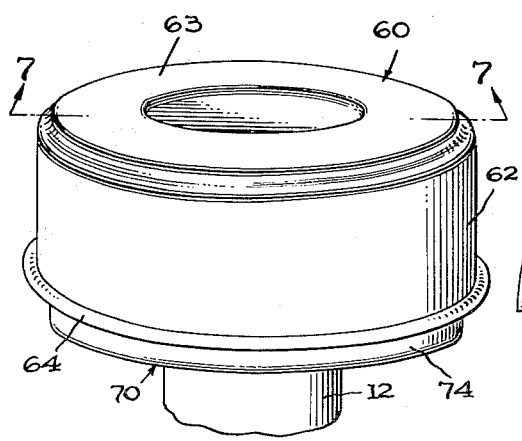
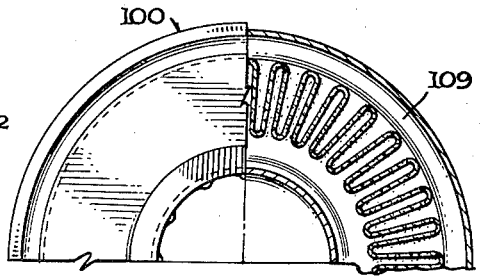
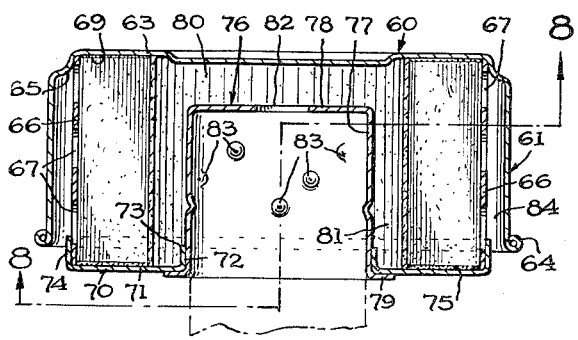
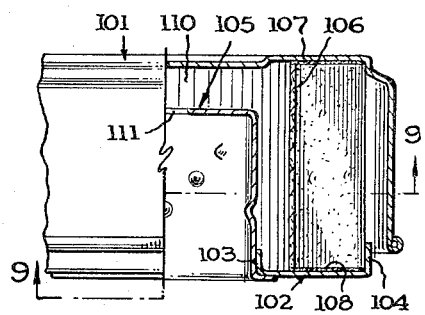
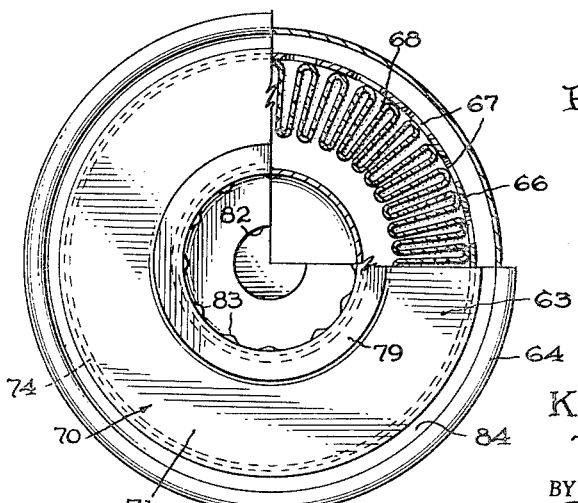

United States Patent Office 3,167,416
Patented Jan. 26, 1965

3,167,416
DISPOSABLE FILTER BREATHER CAP
Kingsley E. Humbert, Jr., and Theodore Kafitz, Gastonia, N.C., assignors to Wix Corporation, Gastonia, N.C., a corporation of North Carolina
Filed Mar. 17, 1961, Ser. No. 96,407
6 Claims. (Cl. 55—498)

This invention relates generally to the class of filters and is directed particularly to improvements in air filtering devices.

Many types of machines have in their design or construction compartments or casings containing different types of fluids and which casings must be provided with openings to permit the exchange of atmospheric air exteriorly of the casings and vapors or fumes within the compartment or casing. At the same time, it is important that the air which enters the casing or compartment be clean or, in other words, have all grit and other particles removed therefrom to prevent contamination of the liquid or fluid in the compartment.

In automobiles there are breather pipes connected with the oil casing and with the fluid transmission chamber and in other types of machinery there are hydraulic systems which are provided with breather pipes and, of course, in connection with the operation of internal combustion engines there are the carburetors which are provided with air openings and in all of these cases it is important that some simple and efficient means be provided for cleaning the air passing into the fluid containing chambers.

In view of the foregoing, it is a particular object of the present invention to provide a new and novel breather filter which may be readily attached to breather pipes of various designs or types and which breather filter is of a disposable character so that when it becomes dirty to the extent that it is no longer efficient, it may be inexpensively discarded and replaced.

Another object of the invention is to provide a completely disposable breather cap or air filter for the purpose stated, having in the construction thereof a controlled pleated filtering medium which may be readily formed or fabricated of filtering paper, wire mesh, treated cloth or a similar substance integral with or permanently attached to an enclosing body forming a permanent part of the filter.

In some types of machines where breather pipes are provided, such pipes may be open in such a way as to permit the entrance of rain or any flying particles and it is therefore a further object of the present invention to not only provide a filtering device for cleansing air entering a breather pipe, but to provide such a device which affords full physical protection to the filtering medium protecting the latter from such environmental hazards as gravel, sticks, rain, etc.

A still further object of the invention is to provide a new and novel disposable breather pipe filter which is designed so that it may be readily applied to and removed from the open end of a breather pipe or an oil filler pipe to not only function as a filtering medium for air entering such pipe, but to also function as a protective cap or cover.

The invention will be best understood from a consideration of the following detailed description taken in connection with the accompanying drawings forming a part of this specification with the understanding, however, that the invention is not confined to a strict conformity with the showing of the drawings but may be changed or modified so long as such changes or modifications mark no material departure from the salient features of the invention as defined by the appended claims.

In the drawings:

FIG. 3 is a sectional view in a vertical diametrical plane taken substantially on the line 3—3 of FIG. 1.

FIG. 4 is a horizontal section taken substantially on the line 4—4 of FIG 3.

FIG. 5 is a view in vertical section of the mounting sleeve in which is shown a pipe securing spring.

FIG. 6 is a view in perspective of a second embodiment of the invention showing the same in association with a breather pipe.

FIG. 7 is a sectional view in a vertical diametrical plane taken substantially on the line 7—7 of FIG. 6.

FIG. 8 is a sectional view taken substantially on the line 8—8 of FIG 7.

FIG. 9 is a sectional detail showing in bottom plan a half portion of a modified form of the structure shown in FIGS. 6 to 8, with portions being in section and showing a further embodiment of the invention.

FIG. 10 is a view partly in section and partly in side elevation of a breather cap constructed on the lines of that shown in FIG. 9, with portions of the same being broken away.

FIG. 11 is a fragmentary detail showing a modification in which the insert member and lid are formed from one piece of material.

Figure 1:
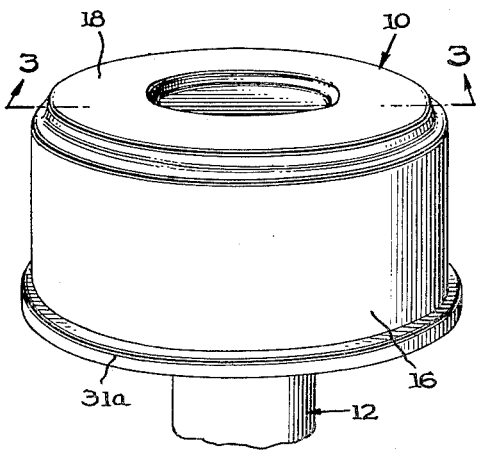
FIG. 1 is a view in perspective of one embodiment of the present invention showing the same in association with a conventional breather pipe.

Referring now more particularly to the drawings, the numeral 10 generally designates the completely disposable breather cap constructed in accordance with one embodiment of the present invention and showing the same with a portion of a pipe which is generally designated 12 and which may represent any type of breather pipe associated with mechanism where the present invention is found applicable for use.

The numeral 14 generally designates the outer shell or weather cover of the breather cap. This weather cover is constructed of a suitable lightweight metal and comprises the lower wall 16 and the top or head 18, these parts being in one piece and preferably pressed or shaped from a single body of metal.

The weather cap wall 16 prior to assembly of the cap parts has the out turned flange 17 to facilitate its joinder or connection with a cover or lid which is generally designated 24 and which lid is designed to admit air into the cap structure from the underside as will hereinafter become apparent.

The lid 24 is fashioned from a single disc of metal and has a central opening 26 defined by an upstanding collar flange 28.

The portion of the lid adjacent to its periphery is formed to define an upstanding, downwardly opening annular channel 30. The outside or overall diameter of this channel substantially approximates the inside diameter of the wall 16 and in assembling the structure the channel 30 of the cap is inserted into the open bottom of the weather cover. A peripheral portion of the lid initially stands outwardly from the channel forming the flange 31 and in the assembling operation this flange 31 is turned or rolled with the flange 17 in the conventional manner to form the blocking bead 31a. Thus the weather cover and the lid form a complete housing for the filter medium and other elements hereinafter described.

The bottom portion 32 of the channel 30 is provided with a plurality of air admission openings here shown as being in the form of slots 33, although they may be of any other desired form and size whereby to regulate to a certain extent the amount of air permitted to pass into the breather cap.

Fitted within the breather cap in this embodiment of the invention and within the circular area defined by the inner side of the channel 30, is a foraminous filtering medium retaining sleeve generally designated 34 which in the present illustration is shown as embodying a sheet metal body 35 of circular or annular form having a multiplicity of apertures 36 therein although, obviously, this foraminous retaining body may be fabricated of a suitable screening or other material and while metal is preferred for its construction, other materials may be employed such as suitable sheet plastic having the required rigidity to retain the filtering medium.

The sleeve 34, as previously stated, is fitted within the area defined by and in engagement with, the inner side of the channel 30, concentrically with the opening 26 and is of a height less than the interior height of the cap structure, the bottom edge of the sleeve resting upon the circular flat surface or floor portion 37 of the lid.

Overlying and covering the top of the sleeve and disposed in close proximity to or against the underside of the head 18, is a flanged cap consisting of the circular plate portion 38 and encircling downturned flange 39, the inside diameter of which is such as to receive and encircle the top of the sleeve 34 over and upon which it is positioned.

Disposed within the sleeve 34 and maintained in position thereby is the filtering medium which is generally designated 40 and which is here illustrated as being of cylindrical or tubular pleated form. While the filtering medium has here been shown as formed of a pleated material such as paper or the like, it should be understood that the invention is not restricted to this type of material but the filtering medium may be formed of paper, wire mesh, treated cloth or any other similar suitable substance.

The inside diameter of the annular filtering medium body is somewhat larger than the outside diameter of the flange 28 which it encircles, as shown in FIG. 3 particularly, whereby an ample air flow space is provided, as hereinafter set forth.

The filtering medium is secured at the top and bottom thereof to the opposing surfaces of the wall portion 37 of the lid and the undersurface of the cap 38, by means of a suitable adhesive which is designated 41 so that the filtering medium becomes a permanent part of the structure.

The numeral 42 generally designates a mounting insert for the cap which is designed to engage over the open top end of a breather pipe. This insert is in the form of a deep cup, consisting of the cylindrical wall portion 43 and the bottom wall 44 and the free end or edge of the wall 43 is flanged as at 45, the flange extending outwardly as shown.

The insert 42 is of a diameter to fit snugly within the collar 28 and as shown the insert is inserted into the lid through the opening 26, bringing the flange 45 against the outer side of the lid 24 to which it is welded or otherwise suitably secured with the collar 28 snugly encircling the insert within the cap.

The insert 42 is of a depth materially less than the depth of the interior of the cap or is materially shorter than the distance between the lid 24 and the filtering medium cap 39 so that there is provided the air space 46 at the inner end of the insert and as the insert wall is spaced from the inner side of the annular filtering medium body there is thus provided an encircling air flow space 47.

The inner end or bottom portion of the insert 42 is provided with one or more apertures 48. These apertures may be formed in the breather cap structure in different sizes to provide a metering means whereby control of the amount of air passing through the filtering cap may be regulated.

Between the metering openings 48 the bottom wall 44 is pressed inwardly along two lines forming the spaced ribs 49. These ribs provide a means for centering against the inner side of the wall 44 and within the insert, the roughly U-shaped spring which is generally designated 50 and which functions to frictionally hold the filter cap in position at the open end of the breather pipe. This spring 50 embodies a strip of metal of suitable resiliency and of a width to fit between the ribs 49, having the leg portions 51 connected by the bridge 52, the latter positioned against the inner side of the wall 44 and having passed therethrough and through the wall the securing rivet 53 whereby the spring is firmly maintained within the insert. The legs 51 of this spring are in divergent relation as shown in FIG. 5 and have terminal portions 54 thereof bent inwardly as shown, thus forming an angle or knee portion 55 which engages against the wall of the insert.

The filter cap structure forming this first embodiment is mounted upon the open end of a breather pipe such as that designated 12 in FIG. 1 by slipping the open end of the insert over the end of the pipe to force the edge of the pipe into the insert between the insert wall and the knee portions 55 of the securing spring 50. Obviously, the insert 52 will be interiorly formed to have a diameter to fit snugly over the particular breather pipe upon which it is designed to be mounted. It will thus be seen that when the filter cap is in position upon a breather pipe air will pass freely upwardly through the openings 33 in the bottom lid and through the foraminous sleeve 34 and the filtering medium into the areas 47 and 48 to pass through the metering openings 48 into the breather pipe 12 upon which it is mounted.

The second embodiment of the disposable breather cap is illustrated in FIGS. 6 to 8. This second embodiment is of somewhat lighter construction than the first described embodiment and may therefore be used on lighter machines or have lighter duty than the more heavily and more rigidly constructed form of FIG. 1.

The second mentioned or lighter duty filter cap is generally designated 60 and comprises, as in the previous structure, an outer portion or weather cover generally designated 61 and formed preferably in one piece or from a single piece of metal or other suitable material to have the circular or annular wall 62 closed at one end by the head 63.

The open end edge of the weather cover 61 is rolled as indicated at 64 to give rigidity to the structure.

The head 63 is pressed or otherwise suitably formed to provide the inside annular corner rib 65 and this rib provides a means for centering within the cover, the foraminous filtering medium encasing and retaining filtering medium sleeve 66, the outside diameter of which approximates the smaller diameter of the rib 65 as shown in FIG. 7. This sleeve, as in the previous case, may be formed of any suitable material such as sheet metal having apertures 67 therein or it may be of suitable weight screen wire or the like.

The sleeve 66 has fitted therein the annular pleated filtering medium 68 and the top edge or top end of this medium is adhesively secured or sealed as at 69 to the inner surface of the head 63 against which it abuts.

The outer or lower end of the sleeve 66 and the outer or lower end of the filtering medium 68 are covered by the lid which is generally designated 70, the latter comprising a disc 71 having the central opening 72 therein defined by the inturned flange 73 and having the outer peripheral upturned flange 74 which encircles and is secured to the outer end of the sleeve 66. The outer end of the filtering medium or pleated annulus forming such medium is secured by a suitable sealing means or adhesive 75 to the inner surface of the plate 71.

The filter cap 60 carries the mounting insert generally designated 76 which, like the hereinbefore described insert 42, is generally in the form of a cup member having the cylindrical wall portion 77 and the bottom wall 78 while the edge of the wall portion 77 is flanged outwardly as at 79. This mounting insert is extended through the collar 73 into the central portion of the pleated annular filtering body or medium and the flange 79 is welded or otherwise secured to the lid as shown and as is also shown, the bottom wall 78 is spaced from the head 63 thus providing the air space 80. Also, an annular air space 81 is provided around the insert as in the first described structure.

The bottom wall 78 of the insert is provided with the air admission opening 82 while the annular wall portion is pressed inwardly to form the buttons 83 which serve to frictionally hold the filter cap in place upon an end of a breather pipe. Preferably at least three annular groups of these buttons are provided, in three planes, with the buttons of the different planes in staggered relation, whereby a very stable mounting of the breather pipe will be obtained.

In the second embodiment it will be seen that due to the spacing of the sleeve 66 from the wall 62 of the weather cover by the flange 65 there is provided the annular air admission area 84, the air entering through the lower part or bottom of the weather cover and then passing radially inwardly through the sleeve 66 and through the filtering medium in an obvious manner to enter the breather pipe by way of the metering opening 82.

FIGS. 9 and 10 illustrate a modified construction of breather cap which may be employed without using the foraminous sleeve shown in the first embodiments, such sleeve being designated 34 in the first embodiment and 66 in the second embodiment. In illustrating a construction minus the foraminous sleeve the form of construction for the breather cap is that shown in FIGS. 6 to 8 but it will be understood, of course, that the form shown in the first embodiment comprising FIGS. 1 to 5 may also be employed without the filter retaining or holding foraminous screen. Accordingly, while FIGS. 9 and 10 show a construction in which the side wall of the head and the lid are in spaced relation around their bottom edges, it is to be understood that the structure of the first embodiment may be made without the retaining sleeve as stated and wherein the lid is seamed or joined at the bottom edge of the head member to make a one piece construction.

In FIGS. 9 and 10 the numeral 100 generally designates a breather cap wherein the head is designated 101 and the lid is designated 102.

The lid 102 has the central opening 103 and the outer edge thereof is defined by the upstanding flange 104 corresponding to the flange 74 in the structure shown in FIG. 7.

Also, the lid 102 is shown with a mounting insert 105 of the same general form as that shown in FIG. 7, which insert is introduced into the structure through the opening 103.

The numeral 106 generally designates the annular pleated filter element which has an inside diameter materially greater than the overall diameter of the mounting adapter 105 and an outside diameter approximating the inside diameter of the flange 104. This filter element is positioned upon the lid 102 and its outer side fits within and against the flange 104 and it is sealed by use of a suitable adhesive at the top and bottom thereof as indicated at 107 and 108 respectively to the under side of the head and to the top surface of the lid as shown.

Accordingly, it will be seen from the foregoing that in the construction shown in FIGS. 9 and 10 air will enter the chamber or annular space 109 and pass radially inwardly through the filter material into the chamber 110 which surrounds the adapter and extends over the inner end of the adapter, to pass through the opening 111 in the inner end wall of the adapter and to the open end of the breather pipe upon which the cap is mounted.

In the case of the construction shown in FIG. 3 it will be understood that the outer diameter of the pleated filter element will approximate the inside diameter of the channel rib 30 to fit therein without having the foraminous sleeve interposed between the filter element and the channel rib.

Figure 2:
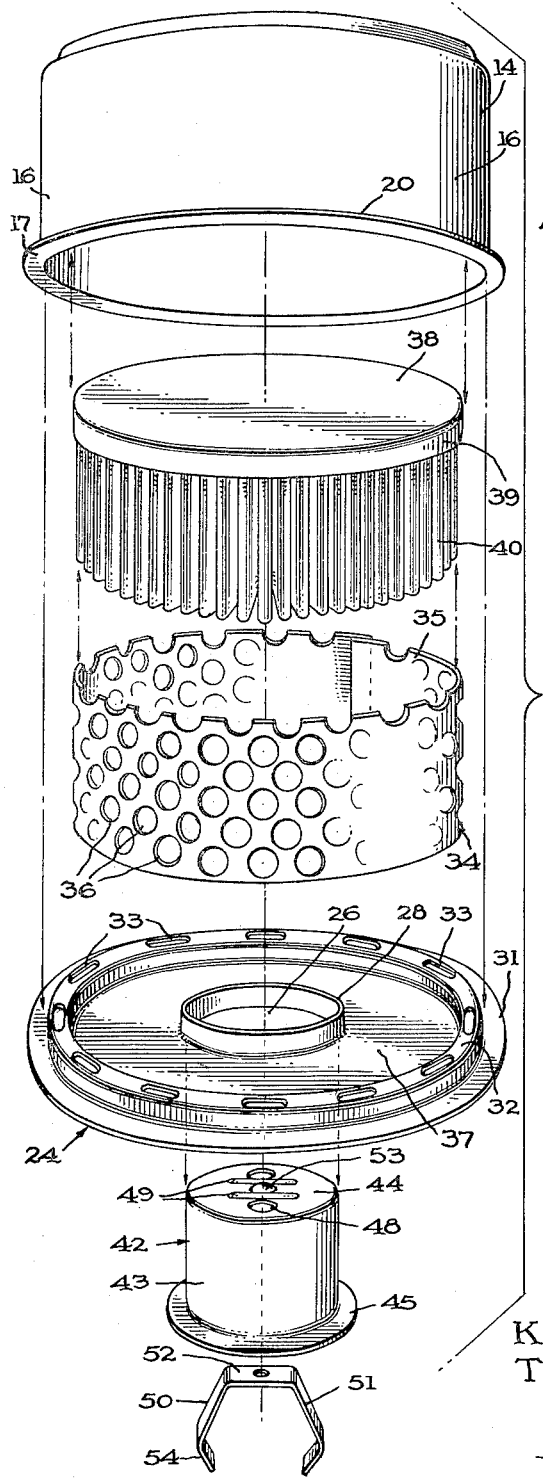
FIG. 2 is an exploded perspective view of the breather cap structure illustrated in FIG. 1, minus the breather pipe, and showing the structural condition of certain of the parts ready for coupling together.

While in the preceding illustrated embodiments of the invention the lids 24 and 70 have been illustrated as having the respective mounting inserts 42 and 76 formed as separate parts joined together by welding or in any other suitable manner, it is also contemplated to form the lid and insert as a unitary structure as illustrated in FIG. 11. In this figure a lid of the type shown in FIG. 2 is depicted and it is generally designated 124 and the insert generally designated 142 is shown as comprising an integral or pressed portion of the material of the lid so that these two parts are all in one piece rather than in two parts as illustrated in the preceding structures.

While the lid 124 is shown as being joined to the wall 116 in a manner similar to that shown in FIGS. 1 to 4, it is to be understood that the lid 70 and insert 76 of the second embodiment may also be formed in a single piece if desired.

From the foregoing it will be apparent that there is provided by the present invention a new and novel disposable air filtering device which is easily and quickly applied to and removed from an end of a breather pipe to be securely held thereon while in use and which will function efficiently to filter air passing through the breather pipe and at the same time effectively prevent the entrance into the breather pipe of undesirable matter such as rain and flying objects, as hereinbefore stated. The filtering medium in both embodiments is fully protected at the top and sides from damage while the device is in use. Also, by regulating the size of the openings 48 or 82 a metering of the air flow is possible and since the device in both of its forms is of simple construction it may be economically produced and inexpensively marketable.

We claim:

1. A fully disposable air filter cap for attachment to the open top end of a breather pipe, said cap comprising an open bottom outer shell having a top wall and a skirt wall integral with and depending from the periphery of the top wall, a lid embodying a flat, circular floor portion having a central opening defined by an upstanding collar flange, an annular wall forming means comprising an upstanding portion of said lid radially remote from said collar flange, a central mounting insert in the form of a deep, inverted cup for receiving said end of a breather pipe and having a bottom wall and a cylindrical side wall, the side wall terminating in an outwardly projecting flange, the insert extending upwardly through said central opening of said floor portion and being tightly encircled by said collar flange and having said floor portion resting on and secured to said outwardly projecting flange, a cylindrical filter unit consisting of a relatively long annular body of filter material and an encasing foraminous sleeve therearound, said filter unit resting on and being sealed to said flat circular floor portion of the lid and said sleeve having a bottom end fitting snugly in and secured to said annular upstanding wall forming means of said lid, the top end of said filter unit being connected with the top wall of said shell, the foraminous sleeve being spaced from said shell skirt whereby is formed an air admission space around the filter and the filter unit being interiorly spaced from and encircling said mounting insert and the mounting insert having an air opening through a wall thereof, and said filter cap having all of the elements thereof inseparably connected together for complete unitary disposal.

2. A fully disposable filter cap for a breather pipe, said cap comprising a cylindrical housing having a closed top end and being open at its opposite end, an annular filter body, said filter body being disposed concentrically within the housing, the filter body having one end adhesively secured to the inner side of the closed top end of the housing, a lid member having a central opening and having an integral upstanding encircling peripheral flange, the other end of the annular filter body being positioned within the area defined by said flange and the flange extending around and engaging the outer side of the filter body and the filter being adhesively secured to said lid, said lid having an inwardly extending collar around and defining the said central opening thereof, a cylindrical mounting cup insert secured to and extending through said collar in the central portion of the annular filter body and being concentric with the latter and further being spaced from the inner side of the filter body, said mounting cup insert having an inner end wall in spaced relation with the top end of the housing, means for passing air from the central portion of the filter body through the cylindrical mounting cup insert into a breather pipe with which the mounting cup insert is connected, and means for connecting the open end of the mounting cup insert with the breather pipe.

3. A disposable air filter cap for a breather pipe, said cap comprising a circular housing having a top and having downwardly opening air inlet means, an annular filter body disposed concentrically within the housing and having an inner and outer end and an outside diameter materially less than the inside diameter of the housing whereby to provide an air admission chamber, a cylindrical mounting cup insert of slightly less height than the height of the housing and disposed concentrically with and in the annular filter, said cylindrical insert having an inner end wall and an open outer end, the insert having an air passing opening through the inner end wall thereof and remote from the open end thereof, a lid member adhesively sealed to the outer end of the annular filter body and having a central opening in which the open end of the cylindrical insert is secured, said annular filter body forming a filtering barrier between said air admission chamber and the opening in the inner end wall of the mounting insert, said annular filter body being in the form of a fluted material in which the flutes run axially, with a foraminous sleeve encircling the annular filter body and having an end edge secured to said lid and means carried by the insert for securing the same to the open end of a breather pipe.

4. The invention according to claim 3, wherein said lid is of an overall diameter equalling the diameter of the housing and has the peripheral portion thereof permanently secured to the housing wall, said lid further having an upstanding downwardly opening annular channel disposed around the outer periphery of said annular filter body and joined to the annular filter body and having apertures therethrough in said channel lying between the filter body and the housing wall to which said lid is attached.

5. A fully disposable air filter cap, said cap comprising a cylindrical housing having an integral top closing one end, a first lid member overlying the other end and having a portion thereof adjacent to its periphery in the form of an inwardly projecting channel rib with the edge lying outside of the channel secured to the cylindrical housing whereby said channel rib projects into the housing, said first lid having a central opening, an annular filter body disposed concentrically within the cylindrical housing and encased in an encircling foraminous reinforcing sleeve, said sleeve having an end engaging said first lid and encircled by and secured to the inner side of the channel rib, the annular filter having the end thereof adjacent to said first lid adhesively secured to the inner surface of said first lid, a second lid overlying and sealed to the other end of the annular filter body, a cylindrical mounting cup insert extending into the annular filter body through the said central opening of said first lid, said mounting cup insert having an inner end wall and having its outer end open and the inner end wall being spaced from said second lid and the insert further being spaced from the surrounding filter body, means securing the open outer end of the mounting insert in said central opening of the first lid, the mounting insert having a wall provided with an opening for the passage of air from the filter into a breather pipe with which the open end of the insert is coupled, and means for securing the insert to a breather pipe.

6. A disposable filter cap for a breather pipe, said cap comprising a housing embodying an imperforate top end closure wall and a side wall joined thereto and the housing having a downwardly opening air inlet means, a tubular filter body within the housing and having one end directed toward and closed at said top wall, the filter body being surrounded by and spaced from said side wall to provide an air receiving chamber, a lid member covering the other end of and adhesively joined to and sealing off said other end of said filter body, said lid member having a central opening therein, a tubular mounting cup insert body of less height than the height of the housing and disposed centrally within and spaced from the inside of the tubular filter body, said insert cup body having an inner end wall and an open outer end, said cup body extending through said central opening of said lid member and being secured at its open outer end to the lid member, means permanently securing the filter body to said housing, said cup insert having an air passing opening through a wall thereof and remote from the open end of the cup insert, the said cup body and lid member being permanently joined to said housing, said tubular filter body forming a filtering barrier between said air chamber and the apertured wall of the mounting insert, and means carried by the insert for securing the same to the open end of a breather pipe.

References Cited in the file of this patent

UNITED STATES PATENTS

| | | |
|---|---|---|
| 2,675,886 | McMullen | Apr. 20, 1954 |
| 2,959,248 | Thornburgh | Nov. 8, 1960 |
| 2,973,832 | Cook et al. | Mar. 7, 1961 |
| 3,012,631 | Kaser | Dec. 12, 1961 |

FOREIGN PATENTS

| | | |
|---|---|---|
| 825,299 | Great Britain | Dec. 16, 1959 |